UNITED STATES PATENT OFFICE.

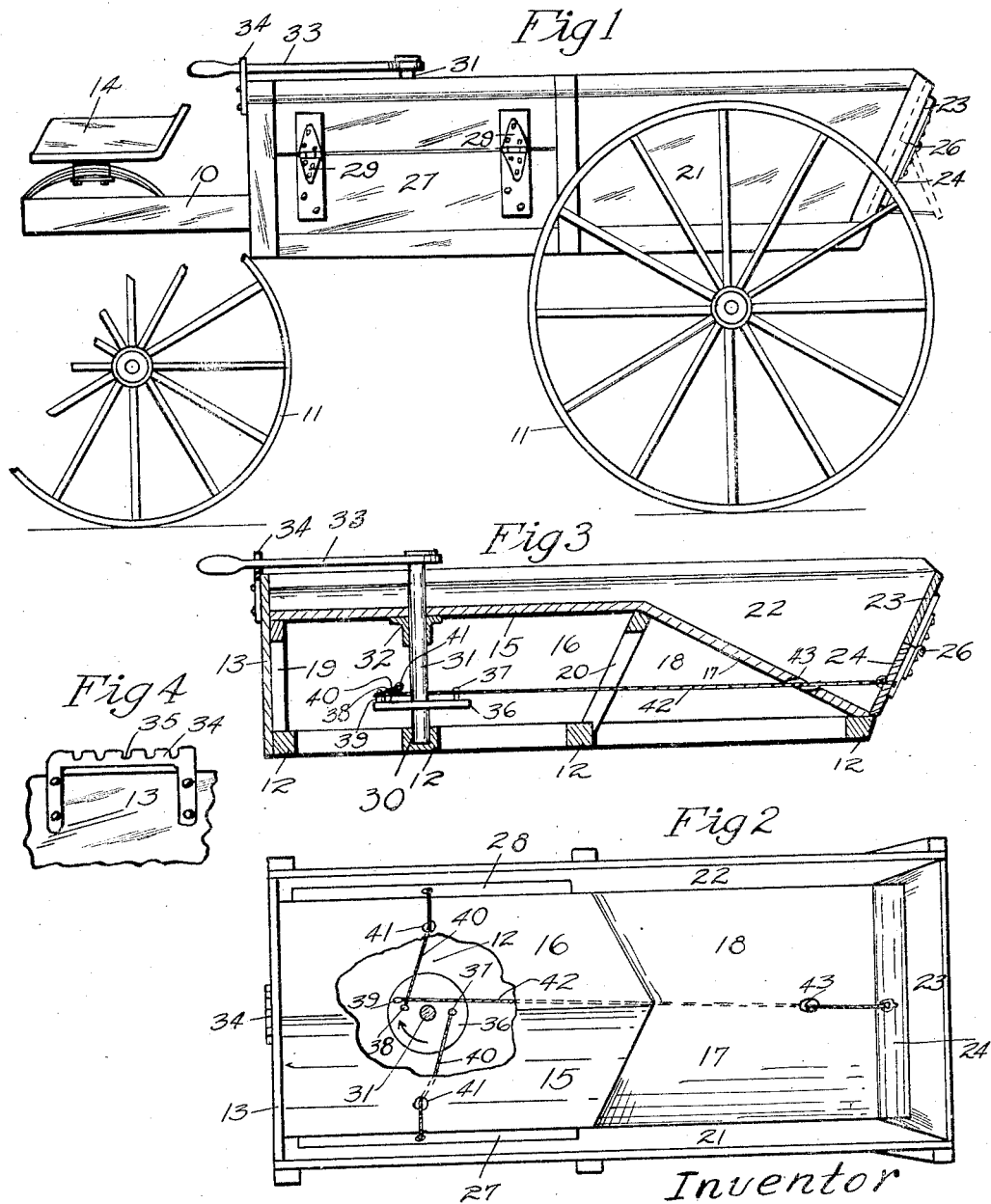

GEORGE E. SARGENT, OF HAMPTON, IOWA.

DUMPING-BED.

1,382,860. Specification of Letters Patent. Patented June 28, 1921.

Application filed July 29, 1920. Serial No. 399,666.

*To all whom it may concern:*

Be it known that I, GEORGE E. SARGENT, a citizen of the United States, and a resident of Hampton, in the county of Franklin and State of Iowa, have invented a certain new and useful Dumping-Bed, of which the following is a specification.

The object of my invention is to provide a dumping bed of simple, durable and inexpensive construction, particularly adapted for discharging gravel for building roads and the like.

A further and more particular object of my invention is to provide such a dumping bed, so constructed and arranged as to discharge the load partially on the side and partially in the rear of the vehicle, so as to spread out the gravel and make necessary a minimum of leveling after the load has been discharged.

A further object is to provide such a device in which the movable members of the dumping bed are controlled from a single lever or controlling element.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a side elevation of a vehicle equipped with a dumping bed embodying my invention.

Fig. 2 shows a top or plan view of the dumping bed.

Fig. 3 shows a central, vertical, longitudinal sectional view through the same; and Fig. 4 shows a front elevation of the notched bar which coacts with the controlling lever.

In the accompanying drawings wherein my invention is illustrated, I have used the reference numeral 10 to indicate generally the frame of a vehicle, such as a gravel hauling wagon, which is supported on the wheels 11.

My improved dumping bed comprises a plurality of spaced cross bars 12 forming frame members at the bottom of the dumping bed. At the front of the bed is a front wall member 13. Supported on the frame of the machine forwardly of the bed is a seat 14 for the driver.

In the bottom of the dumping bed above the cross bars 12 and descending from the front wall 13 rearwardly a substantial distance toward the back of the bed are bottom members 15 and 16, connected at their upper ends and inclined downwardly and laterally. The bottom members 15 and 16 are a little longer at their upper edges than at their lower edges, as illustrated in Fig. 2.

Rearwardly of the bottom members 15 and 16 are bottom members 17 and 18 connected along their longitudinal edges in the center of the bed and inclined downwardly and laterally and also downwardly and rearwardly toward the back of the bed. Braces 19 and 20 support the bottom members.

At the sides of the bed are the side members 21 and 22 which are inclined from their lower edges adjacent to the lower edges of the members 13 and 17 and the members 16 and 18 respectively, upwardly and laterally.

At the sides of the bed is a rear end wall 23, which is inclined from its lower edge upwardly and rearwardly, and has its side edges beveled to fit the side members 21 and 22.

In the lower part of the back member 23 is a hinged door 24, hinged at its upper edge as at 26 to the body of the rear wall member 23, and adapted to swing from closed position, as illustrated for instance in Fig. 3, rearwardly and outwardly as illustrated in dotted lines in Fig. 1.

In the forward lower portion of the side members 21 and 22 are hinged side doors 27 and 28, hinged at their upper edges as at 29 to the bodies of the side wall members 21 and 22.

Mounted in a suitable socket 30 in one of the cross members 12, as illustrated in Fig. 3, is an upright shaft 31, which projects upwardly through a bearing 32, and through the members 15 and 16 to a point substantially above them.

On the upper end of the shaft 31 is a forwardly extending lever 33 projecting to position convenient of access from the driver's seat.

Adjacent to the forward end of the lever 33, there is mounted on the front wall member 13, a notched bar 34, having notches 35, into which the lever 33 may be dropped. The lever 33 has a slight degree of up and down play to permit it to be moved from one notch 35 to another.

On the shaft 31 below the bottom members 15 and 16 is a disk or the like 36, having pins 37, 38 and 39. Connected with the pins 37 and 38 are flexible members 40, which extend through holes 41 in the lower portions of the bottom members 15 and 16 and are connected to the lower edges of the doors 27 and 28, as illustrated for instance in Fig. 2.

Connected with the pin 39 is a flexible device 42 extending rearwardly and projecting through holes 43 in the bottom members 17 and 18, and connected at its rear end with the lower edge of the door 24, as shown in Fig. 2.

When the doors are in closed position, the pins 37, 38 and 39 preferably stand substantially in a fore-and-aft line, extending through the bed as shown in Fig. 2 of the drawings, and the lever 33 is received in one of the notches 35 and locked against movement, thus holding the doors in their closed position.

The dumping bed may then be loaded with gravel and the vehicle hauled to the point of discharge. When the proper place in the road or otherwise for discharging the load has been reached, the driver grasps the handle of the lever 33 and lifts said lever, whereupon the weight of the gravel pressing outwardly against the doors 24, 27 and 28 will force the doors outwardly for permitting the gravel to pour out from the bed.

It will be noted in this connection that the gravel will be discharged partially behind the vehicle and partially at the side thereof. The doors 27 and 28 are of such length and are so located with relation to the wheels that the gravel discharged at the sides of the dumping bed does not drop into the working mechanism of the vehicle.

By discharging the gravel on both sides and behind the vehicle, it will be discharged over a considerable area instead of being dumped in one place, as is the case with ordinary dumping devices.

In discharging the gravel on both sides and behind the vehicle, very little spreading out or leveling is required after the gravel has been discharged from the dumping bed.

The wheels are set far enough from the sides of the dumping bed, so that they do not interfere with the opening of the doors 27 and 28. Gravel will flow freely from the dumping bed and no trouble is experienced in discharging the entire load from the bed.

For hauling fine sand, the angles of inclination of the bottom members may be increased slightly from the angles necessary for use in hauling gravel.

After the load has been discharged, the lever 33 may be used for bringing the doors back to their closed position.

It will be noted that if the flexible members 40 and 42 should stretch somewhat, the lever 33 can be adjusted in a different notch 35 for holding the doors tightly closed for loading.

My improved dumping bed has the advantage of distributing the load over a considerable area, discharging rapidly and not discharging the load into the wheels or upon the axle or working parts of the vehicle.

A great advantage of my dumping bed lies in its cheapness and simplicity and the small number of working parts. A bed of this kind does not quickly get out of order. Few repairs are necessary and such as are required can be quickly and easily made.

Some changes may be made in the construction and arrangement of the various parts of my improved dumping bed, without departing from the real spirit and purpose of my invention, and it is my intention to cover by my claims, any modified forms of structure or use of mechanical equivalents, which may be reasonably included in their scope.

I claim as my invention:

1. In a dumping device, a frame, traction devices thereon, a dumping bed on said frame, having a front wall, inclined side and back walls, bottom members connected at their upper edges and inclined downwardly and outwardly, hinged doors in the side and back walls, a single controlling device operatively connected with all of said doors, a shaft, a disk device thereon, controlling members connecting said disk device with said doors, a lever fixed to said shaft, and means for holding said lever in certain adjusted positions.

2. In a dumping bed, a frame, a seat thereon, a front wall, inclined side and back walls, bottom members connected at their upper edges and inclined downwardly and outwardly, terminating short of the back wall, bottom members inclined from the first bottom members downwardly and laterally and rearwardly, hinged doors at the sides and back of said bed, an upright shaft, a disk device thereon below said first described bottom members, flexible controlling devices connected with said disk device extending through said bottom members and secured to said doors, and means for rocking said shaft.

3. In a dumping bed, a frame, a seat thereon, a front wall, inclined side and back walls, bottom members connected at their upper edges and inclined downwardly and outwardly, terminating short of the back wall, bottom members inclined from the first bottom members downwardly and laterally and rearwardly, hinged doors at the sides and back of said bed, an upright shaft, a disk device thereon below said first described bottom members, flexible controlling devices connected with said disk device extending through said bottom members and secured to said doors, and means for rocking said shaft, comprising a lever projecting to position adjacent to said seat, and means for holding said lever in various adjusted positions.

Des Moines, Iowa, July 13, 1920.

GEORGE E. SARGENT.